United States Patent
Gritti

(10) Patent No.: US 10,162,439 B2
(45) Date of Patent: Dec. 25, 2018

(54) SHOCK TOUCH PROTECTION OF A MOBILE DEVICE

(71) Applicant: KONINKLIJKE PHILIPS N.V., Eindhoven (NL)

(72) Inventor: Tommaso Gritti, Breda (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/373,756

(22) PCT Filed: Feb. 6, 2013

(86) PCT No.: PCT/IB2013/050972
§ 371 (c)(1),
(2) Date: Jul. 22, 2014

(87) PCT Pub. No.: WO2013/121323
PCT Pub. Date: Aug. 22, 2013

(65) Prior Publication Data
US 2015/0029119 A1 Jan. 29, 2015

Related U.S. Application Data

(60) Provisional application No. 61/598,424, filed on Feb. 14, 2012.

(51) Int. Cl.
*G06F 3/041* (2006.01)
*G06F 11/00* (2006.01)
*G06F 11/30* (2006.01)

(52) U.S. Cl.
CPC ............ *G06F 3/041* (2013.01); *G06F 3/0416* (2013.01); *G06F 11/004* (2013.01); *G06F 11/3058* (2013.01); *G06F 11/3013* (2013.01)

(58) Field of Classification Search
CPC .............. G06F 3/0416; G06F 11/3013; G06F 11/3058; G06F 3/041; G06F 3/016; G06F 3/045; G06F 11/004
(Continued)

(56) References Cited

U.S. PATENT DOCUMENTS 4,114,450 A * 9/1978 Shulman et al. ............... 73/489
2004/0238758 A1* 12/2004 Antonius Theodorus Dams ........
G03F 7/70725
250/491.1
(Continued)

FOREIGN PATENT DOCUMENTS

EP 2363785 A1 9/2011
JP 2010026605 A 2/2010
(Continued)

*Primary Examiner* — Insa Sadio

(57) ABSTRACT

A mobile device (1) is disclosed comprising a data processing facility (10), a touch control facility (20) arranged to provide a touch input signal (St) to the data processing facility, and a motion state sensor facility (30) arranged to provide a shock indication signal (Sj) indicative for a magnitude of a third or higher derivative of a position of the mobile device. The mobile device further comprises a mode control facility (15) for selecting one of a plurality of mutually different operational modes (M1, M2). The plurality of mutually different operational modes at least comprises a normal operation mode (M1) wherein the touch input signal is used as control signal for controlling operation of the mobile device and a shock touch protection mode (M2), wherein the touch input signal is inhibited.

12 Claims, 5 Drawing Sheets

(58) Field of Classification Search
USPC .................. 345/173–174, 156; 73/489, 509; 702/141
See application file for complete search history.

(56) References Cited

U.S. PATENT DOCUMENTS

| | | | |
|---|---|---|---|
| 2010/0113101 A1 | 5/2010 | Tanada | |
| 2010/0177057 A1* | 7/2010 | Flint et al. | 345/174 |
| 2010/0255886 A1 | 10/2010 | Shouji | |
| 2010/0256947 A1* | 10/2010 | Kim | G06F 1/1626 702/141 |
| 2010/0268426 A1 | 10/2010 | Pathak et al. | |
| 2011/0053641 A1 | 3/2011 | Lee et al. | |
| 2011/0267026 A1* | 11/2011 | Locker | G06F 1/3203 323/318 |

FOREIGN PATENT DOCUMENTS

| | | |
|---|---|---|
| JP | 2010140458 A | 6/2010 |
| JP | 201161316 A | 3/2011 |
| JP | 2013015461 A | 1/2013 |
| TW | 200930024 A | 7/2009 |

\* cited by examiner

SHOCK TOUCH PROTECTION OF A MOBILE DEVICE

CROSS-REFERENCE TO PRIOR APPLICATIONS

This application is the U.S. National Phase application under 35 U.S.C. § 371 of International Application No. PCT/IB2013/050972, filed on Feb. 6, 2013, which claims the benefit of U.S. Provisional Application No. 61/598,424, filed on Feb. 14, 2012. These applications are hereby incorporated by reference herein.

FIELD OF THE INVENTION

The present invention relates to a mobile device.
The present invention further relates to a method of operating a mobile device.
The present invention still further relates to a storage medium having stored thereon a computer program enabling a processor to carry out the method.

BACKGROUND OF THE INVENTION

In recent years a major shift toward mobile computing has taken place due to the abundant availability of various mobile devices. Examples are palmtops, MDA's (Mobile Digital Assistant), PDA's (Personal digital assistants), DAP's (digital audio players), PMP's (Portable media players), digital cameras, cell phones, Pocket PC's and GPS devices (Global Positioning System). These mobile devices may be hand-held or be integrated in a car or other vehicle.

Several factors influenced this dramatic change, but the most relevant has been a combination of multi-touch interface with a range of operating systems allowing for a user interaction experience optimized for touch interface. At the same time, users have started to adopt mobile devices in more and more active contexts: on the train, car, boat, flight, and even bikes. It is a problem that controlling a touch based device while moving (or being part of a moving vehicle) often has the effect that a user inadvertently activates the mobile device or activates the device in a way not intended.

SUMMARY OF THE INVENTION

It is a first object of the invention to provide a mobile device that at least partly mitigates this problem.
It is a second object of the invention to provide a method for operating a mobile device that at least partly mitigates this problem.
It is a third object of the invention to provide a storage medium having stored thereon a computer program enabling a processor to carry out a method that at least partly mitigates this problem.
According to a first aspect of the invention a mobile device is provided comprising
a data processing facility,
a touch control facility arranged to provide a touch input signal to the data processing facility,
a motion state sensor facility arranged to generate a shock indication signal indicative for a magnitude of a third or higher derivative of a position of the mobile device,
a mode control facility for selecting one of a plurality of mutually different operational modes, at least comprising a normal operation mode wherein the touch input signal is used as control signal for controlling operation of the mobile device and a shock touch protection mode, wherein the touch input signal is inhibited.

The mode control facility allows the mobile device to suppress involuntary or erroneous touch input signals that result from shocks by inhibiting the touch input signal. Inhibition of the touch input signal can take place by switching off the touch control facility or by preventing that a rendered touch input signal is processed. The mobile device according to the present invention has a motion state sensor facility arranged to generate a shock indication signal indicative for a magnitude of a third or higher derivative of a position of the mobile device. This signal is directly or indirectly used by the mode control facility. For example the mobile device may comprise a threshold facility for comparing the magnitude indicated by the shock indication signal with a shock threshold value and providing a mode control signal indicative for a result of this comparison.

It is noted that JP2011-61316 describes a mobile device that is provided with a proximity sensor that detects whether the mobile device is held close to the body, e.g. against the ear of a user. If this state is detected the mobile device assumes an operational mode wherein touch input is inhibited. The mobile device further has an acceleration sensor that determines whether the mobile device is accelerated. In the latter case, the sensitivity of the proximity sensor is increased. The signal of the acceleration sensor is not used for inhibiting the touch input. As long as the proximity sensor does not detect that the mobile device is held close to the body, the mobile device normally accepts touch input signals. Moreover, the acceleration signal is not suitable for shock control management. A user in an environment, e.g. elevator or train, that is accelerated with a constant or slowly changing magnitude can normally operate the mobile device by touch without risking involuntary touch events.

In an embodiment the mobile device directly uses the shock indication signal in that upon indication by the mode control signal that said magnitude is greater than the shock threshold value the mobile device assumes the shock touch protection mode.

In an embodiment the mobile device indirectly uses the shock indication signal in that upon indication by the mode control signal that said magnitude is greater than the shock threshold value the data processing facility assumes a shock touch alert mode, wherein a user is proposed to activate the shock touch protection mode.

In an embodiment both direct and indirect use of the shock indication signal occurs. The mobile device may for example assume the shock touch alert mode when said magnitude is greater than a first shock threshold value and assume the shock touch protection mode when said magnitude is greater than a second shock threshold value greater than the first shock threshold value.

A shock threshold value may have a fixed value, but the shock threshold value may alternatively be dynamically adapted according to circumstances. In an embodiment the mobile device comprises a threshold adaptation facility. The threshold adaptation facility is arranged to adapt the shock threshold value according to a history of the shock input signal, wherein the shock threshold value is positively correlated with said magnitude indicated by the shock input signal.

In an embodiment, the shock indication signal is also indicative for a direction of the shock and an operational mode is selected that depends on a magnitude and direction indicated by the shock indication signal. Sensors for this purpose are commercially available. For example MEMS based acceleration sensors are available that provide acceleration signals indicative for an acceleration measured along each of three orthogonal axes. The jerk components corresponding to the first derivative of each of these accelerations can be selectively used for mode control. Alternatively jerk may be directly measured according to each of three orthogonal axes. In an embodiment the mobile device is relatively insensitive to a shock in a direction perpendicular to a plane defined by the touch control facility (touch control plane) in comparison to a shock in a direction in said plane. This is for example advantageous in gaming environments, wherein a fast reaction of the user is required. In that circumstances the touch actions of the user may induce a shock mainly perpendicular to the touch control plane, by the force with which the user touches the touch control facility and/or by a movement of the hand with which the user holds the mobile device. This relative insensitivity for shock in a direction perpendicular to the touch control facility may be realized by a separate, relatively high shock threshold for a shock in a direction perpendicular to the touch control facility. Then shocks having a direction mainly perpendicular to the touch control plane will only cause the mobile device to assume the shock touch protection mode if they have a relatively high magnitude. Preferably the direction sensitive motion state sensor, e.g. jerk sensor is aligned with the touch control plane. However, in case the direction sensitive motion state sensor is not aligned in this way, aligned shock indication signals may be obtained by a matrix transformation. In another embodiment the relative insensitivity for shock in a direction perpendicular to the touch control facility may be realized by a direction indication facility that provides a direction signal indicative for a direction of the shock relative to a normal of the touch control plane. The direction signal can be used to control the sensitivity for shocks exerted to the device, for example by controlling the threshold as a function of the direction signal.

The direction sensitivity may be made dependent on the type of application. To that end the data processing facility may provide a direction sensitivity control signal that controls the direction dependency of the mode control facility.

In a particular embodiment of the mobile device the touch input signal, although inhibited in the shock touch protection mode, is not completely blocked. In that embodiment the mobile device may have a mode control overrule unit that that enables control by the touch input signal if it determines that a probability that the touch control signal results from a voluntary user action is greater than a probability threshold. In an embodiment this is realized in that the mode control overrule unit detects whether the user consistently repeats a particular user action. For example if the user repeatedly touches the touch control facility within a narrow region the mode control unit determines that a probability that the touch control signal results from a voluntary user action is greater than a probability threshold, and allows control by the touch input signal even if the mobile device operates in the shock touch protection mode.

An embodiment of the mobile device according to the first aspect comprises a timer facility for maintaining the mobile device in shock touch protection mode until a predetermined time-interval after the last occurrence of said magnitude greater than said shock threshold value. Therewith the behavior of the mobile device is more predictable to the user, in that the mobile device does not switch too frequently between different operational modes. In this embodiment a user interface of the mobile device may provide an indication for the remaining duration of the time-interval. The user interface may further provide for a user control option to stop the timer, so that the normal operation mode is immediately resumed if desired by the user.

An embodiment of the mobile device according to the first aspect comprises a delay facility for delaying the touch input signal.

According to a second aspect of the invention a method of operating a mobile device is provided that comprises the steps of generating a shock indication signal indicative for a magnitude of a third or higher derivative of a position of the mobile device, processing the shock indication signal, depending on the shock indication signal selectively operating in one of a plurality of mutually different operational modes, at least comprising a normal operation mode wherein a user is enabled to provide a touch input signal as control signal for controlling operation of the mobile device, and a shock touch protection mode, wherein control by touch input signals is inhibited.

According to a third aspect of the invention a storage medium is provided having stored thereon a computer program enabling a processor to carry out the method according to the second aspect.

BRIEF DESCRIPTION OF THE DRAWINGS

These and other aspects are described in more detail with reference to the drawing. Therein.

DETAILED DESCRIPTION OF EMBODIMENTS

Like reference symbols in the various drawings indicate like elements unless otherwise indicated.

Figure 1:
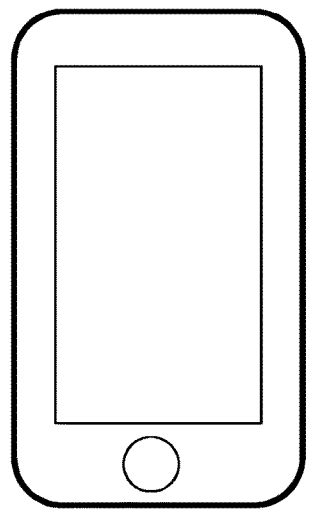
FIG. 1 schematically shows a mobile device.

FIG. 1 schematically shows a mobile device 1. The mobile device 1 is for example one of a palmtop, an MDA, a PDA, a DAP, a PMP, a digital camera, a cell phone, a Pocket PC, a GPS device or other mobile device. The mobile device 1 may be temporarily or permanently integrated in a car or other vehicle.

Figure 2:
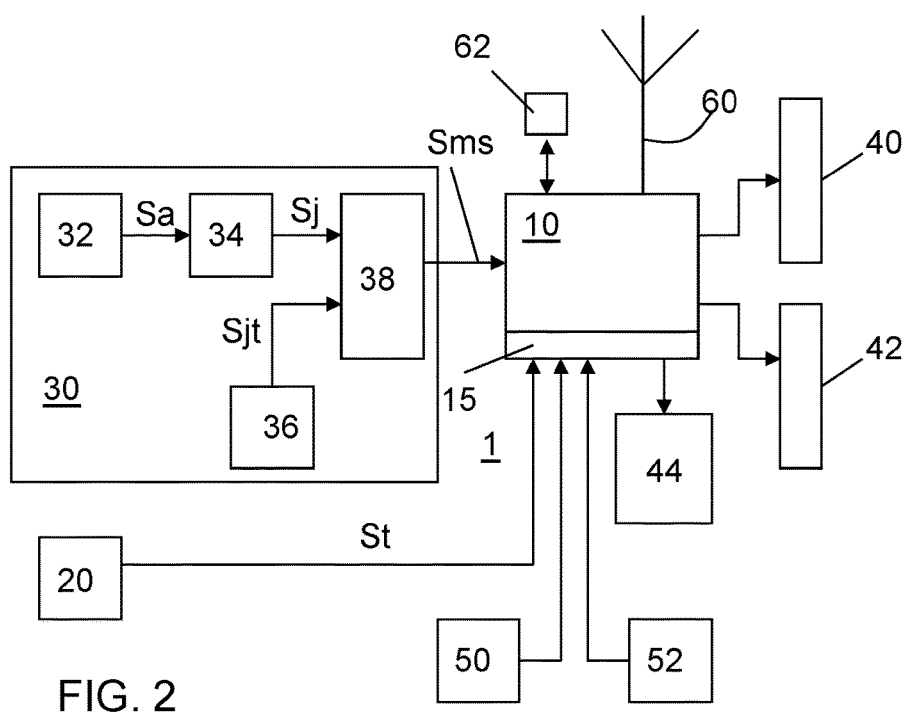
FIG. 2 schematically shows a first embodiment of a mobile device according to the first aspect of the present invention in more detail, FIG. 3 schematically shows an overview of various operational modes selectable in an embodiment of a method of operating according to a second aspect of the present invention, FIG. 4 schematically shows a second embodiment of a mobile device according to the first aspect of the present invention in more detail, FIG. 5 schematically shows a third embodiment of a mobile device according to the first aspect of the present invention in more detail, FIG. 6 schematically shows a fourth embodiment of a mobile device according to the first aspect of the present invention in more detail, FIG. 7 schematically shows a fifth embodiment of a mobile device according to the first aspect of the present invention in more detail, FIG. 8 schematically shows a sixth embodiment of a mobile device according to the first aspect of the present invention in more detail.

The mobile device 1, of which a first embodiment is schematically shown in FIG. 2 comprises a data processing facility 10. The mobile device further comprises a touch control facility 20 arranged to provide a touch input signal St to the data processing facility 10 and a motion state sensor facility 30 arranged to generate a shock indication signal Sj. The shock indication signal Sj is indicative for a magnitude of a third or higher derivative of a position of the mobile device 1.

Figure 3:
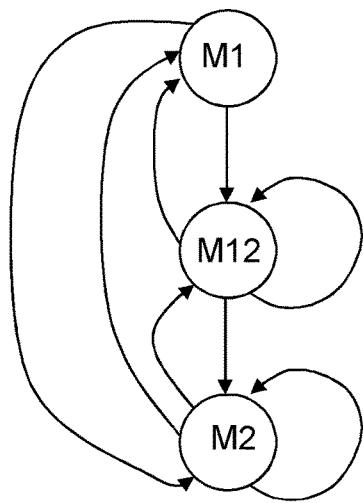

The mobile device 1 further has a mode control facility 15. The mode control facility 15 serves to select one of a plurality of mutually different operational modes as is illustrated in FIG. 3.

In a normal operation mode M1 the touch input signal is used as control signal for controlling operation of the mobile device. The mobile device also has a shock touch protection mode M2, wherein the touch input signal St is inhibited.

In this case the motion state sensor facility 30 comprises an acceleration sensor 32. The motion state sensor facility 30 further includes a differentiator 34 for calculating a time derivative of an acceleration indicated by an output signal Sa of the acceleration sensor and providing an output signal Sj indicating a jerk value of this derivative, for example indicating a magnitude of the jerk vector or a magnitude of the largest component in the jerk vector. The mobile device 1 further comprises a threshold indicating device 36 for providing a jerk threshold signal Sjt indicative for a jerk threshold value. A comparator 38 included in the motion state sensor facility 30 compares the jerk value with the jerk threshold value indicated by the jerk threshold signal Sjt and provides a mode control signal Sms to the mode control facility 15 that indicates whether the magnitude of the jerk exceeds the threshold indicated by jerk threshold signal Sjt. The result of the comparison by comparator 38 is used to control the operation of the data processing facility 10 and therewith the operation of the mobile device 1. In this case the mobile device has in addition to a normal operation mode M1 and a shock touch protection mode M2 also a shock touch alert mode M12 as is schematically illustrated in FIG. 3. During the normal operation mode M1 the data processing facility 10 normally processes all touch input signals St. If the comparator 38 determines that the jerk value indicated by signal Sj exceeds the jerk threshold value then the mobile device assumes the shock touch alert mode M12. In this mode the data processing facility 10 still processes all touch input signals St, but a warning is signaled to the user indicating the risk of erroneous inputs and the user is asked whether shock touch protection mode is desired. If this is confirmed by the user, the data processing facility 10 assumes the shock touch protection mode M2, wherein touch input signals St are inhibited. The user may confirm by touch input, but alternative other input means may be provided for this purpose, for example audio input means. In an embodiment, the comparator may be arranged to provide a motion state signal that further indicates whether the jerk value exceeds a second threshold value, higher than the first threshold value. In that case the data processing facility directly assumes the shock touch protection mode M2, without requesting confirmation from the user. The user may use this feature in mode M12 for giving confirmation by shaking the mobile device.

The shock touch alert mode M12 may be ended for example by offering the user a choice to refuse entering shock touch protection mode. In that case the data processing facility 10 reassumes the normal operation mode M1.

The shock touch protection mode M2 may be terminated upon explicit request by the user, but may alternatively be terminated automatically if it is determined that the jerk value was less than a jerk threshold value, for example the second jerk threshold value during a predetermined amount of time. Upon automatic termination of shock touch protection mode M2, the data processing facility 10 may directly reassume the normal operation mode M1, but the data processing facility 10 may alternatively assume the shock touch alert mode M12, wherein the user is requested to indicate whether a transition to normal mode M1 is desired. It is noted that the mobile device 1 may have other operation modes, for example the device may have intermediary shock touch protection modes, wherein touch input operations requiring fine touch input are inhibited, and touch input operations requiring course touch input are still possible.

In the embodiment shown the jerk signal Sj is obtained by time differentiation of the acceleration signal. However, the jerk signal Sj may be determined in other ways. For example the output signal Sj may be directly generated by a jerk sensor. See e.g. jerk sensor 33 in FIG. 6. Alternatively, if the position of the device can be accurately determined, the jerk may be determined by a three fold differentiation of the position. Alternatively the shock indication signal may be indicative for a magnitude for a fourth and higher order derivatives of the position.

Depending on its function, the mobile device may comprise various other facilities, e.g. a display 40, a speaker 42 and/or a vibration-device 44 or other output facilities. In case a display 40 is present, the touch control facility may be integrated therein. Also other input facilities such as a microphone 50 or a camera 52 may be provided. The mobile device may further be provided with communication facilities for wired or wireless communication with other devices, such as an antenna 60 or communication port 62.

Figure 4:
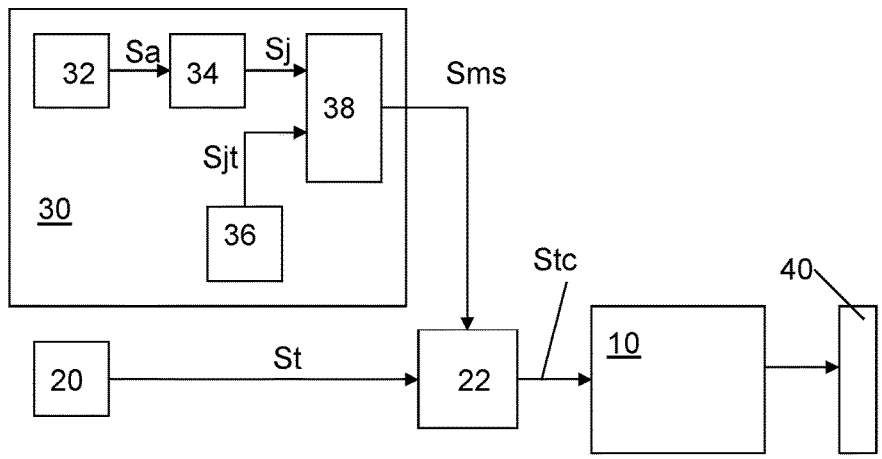

FIG. 4 shows a second embodiment. Therein the device comprises a separate touch input controller 22 that selectively passes the touch input signals St as controlled touch input signals Stc depending on the mode control signal Sms provided by the motion state sensor facility 30. Therewith the touch input controller 22 functions as a mode control facility.

Figure 5:
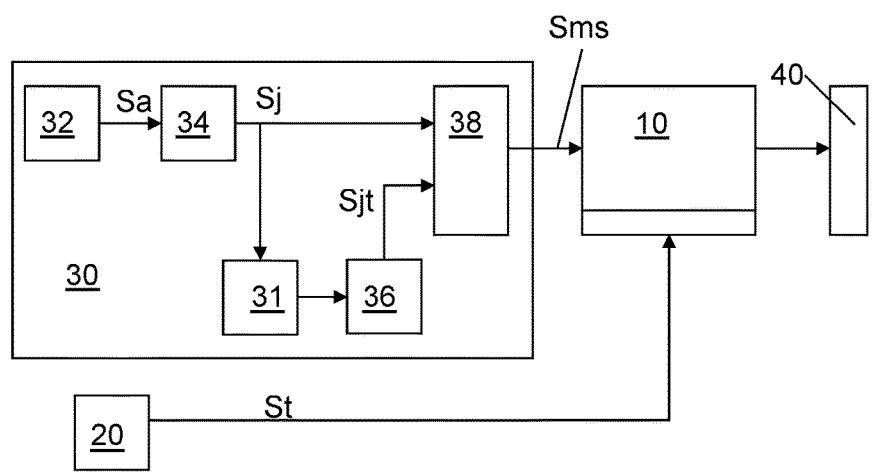

FIG. 5 shows a third embodiment. In the embodiment of FIG. 5 the mobile device comprises a threshold adaptation facility 31, the threshold adaptation facility 31 is arranged to adapt the jerk threshold value Tj indicated by the jerk threshold signal Sjt according to a history of the jerk input signal Sj. The jerk threshold value is positively correlated with a magnitude of the jerk J indicated by the jerk input signal Sj. This is to take into account that a user may be surprised by suddenly occurring jerk, even if the jerk has a moderate value. However, the user getting accustomed to a certain level of jerk, for example when sitting in a car or train may be well capable of controlling the mobile device 1. By way of example the threshold adaptation facility 31 may set the threshold Tj to a value proportional to a moving average of the magnitude of the jerk J. The moving average may be capped to a maximum value, to make sure that the shock touch protection mode is still activated in cases of excessive jerk.

Figure 6:
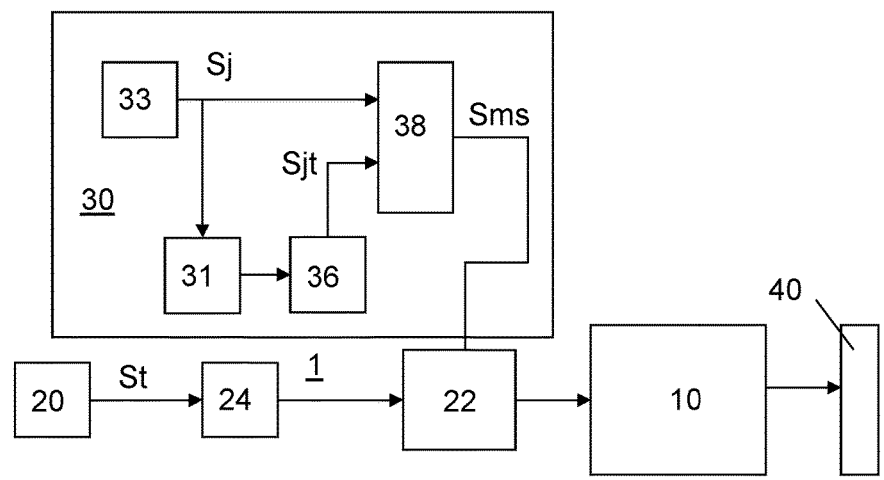

FIG. 6 shows a fourth embodiment. The mobile device 1 is a delay facility 24 for delaying the touch input signal St. Therewith the touch input signal St is delayed with a time-interval corresponding to a response time of the motion state sensor facility 30 and the mode control facility 22. The delay facility 24 is equally applicable in other embodiments, e.g. the embodiments described with reference to FIGS. 3 to 5. The delay facility 24 avoids that a touch signal St involuntary induced at the onset of a shock can be processed normally, before the mode control facility 22 (or 15) could inhibit this touch signal. In order to avoid interference with normal operation, the time-interval with which the touch input signal Tj is delayed is preferably not longer than necessary for this purpose, i.e. at least not substantially longer than the combined response time of the motion state sensor facility 30 and the mode control facility 22. The mobile device of FIG. 6 has a jerk sensor 33 that directly measures the jerk to which the mobile device 1 is exposed and generates an output signal Tj indicative thereof.

Figure 7:
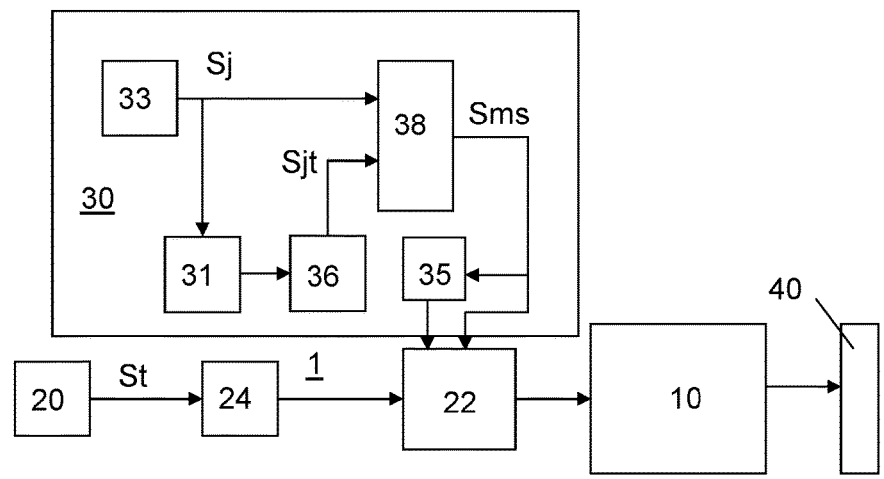

FIG. 7 shows a fifth embodiment. Therein the mobile device 1 comprises a timer facility 35. The timer facility 35 maintains the mobile device in shock touch protection mode M2 until a predetermined time-interval after the last occurrence of said magnitude greater than the jerk threshold value. The timer facility 35 is activated each time upon indication by the mode control signal Sms that the magnitude indicated by the shock indication signal Sj is greater than the shock threshold value Sjt. As long as the timer facility 35 is active, the (delayed) touch input signal St is inhibited, and therewith the mobile device is maintained in shock touch protection mode M2. The timer facility 35 is also applicable in other embodiments, e.g. embodiments wherein the mode control facility 15 is integrated in the data processing facility 10.

Figure 8:
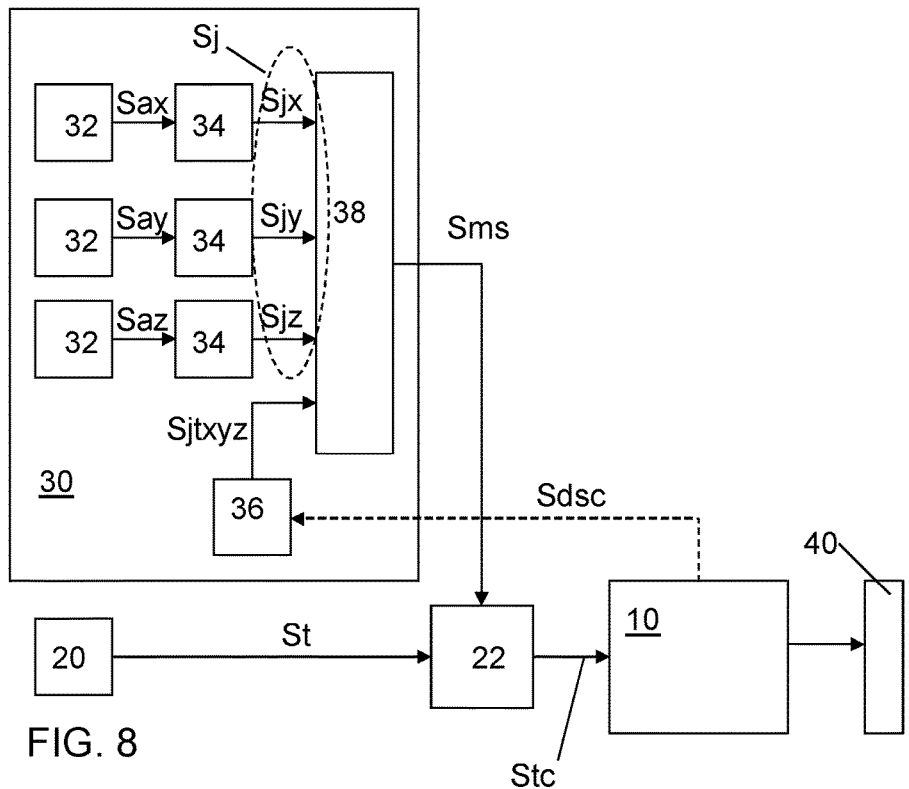

FIG. 8 shows a sixth embodiment of the mobile device 1. Therein the shock indication signal Sj is also indicative for a direction of the shock. In this case the shock indication signal Sj has separate components Sjx, Sjy, Sjz. The components Sjx, Sjy, Sjz of the shock indication signal are indicative for the components Jx, Jy, Jz of the jerk J. The component Jz is the component of the jerk J in a direction perpendicular to the touch control plane defined by the touch control facility 20 and Jx and Jy are the components aligned with the touch control plane. The threshold indicating device 36 provides a control signal Sjtxyz indicative for a jerk threshold Jtx, Jty, Jtz for each of the directions x,y,z. Therewith the mode control facility 22 is arranged to select an operational mode that depends on a magnitude and direction indicated by the shock indication signal Sjx, Sjy, Sjz. The mobile device may have predetermined direction dependent shock sensitivity, in that the jerk threshold Jtz has predetermined relatively high value in comparison to the components Jtx, Jty. Alternatively, the direction dependency of the shock sensitivity may be controllable, for example, the data processing facility 10 may provide a direction sensitivity control signal Sdsc dependent on the application processed by the data processing facility 10. For example in a gaming mode the data processing facility 10 may cause the threshold indicating device 36 to set the jerk threshold Jtz at a relatively high value as compared to the jerk thresholds Jtx, Jty, whereas for other applications, such as reading mail or watching movies the thresholds Jtx, Jty, Jtz are at the same value. The threshold(s) may further be dependent on the function of the input. For example in the context of input actions that may cause high damages, e.g. a delete function or a disk format function, the thresholds may be set at a level higher than normal. The threshold(s) may further be adapted according to a history of the shock input signal Sj.

Figure 9:
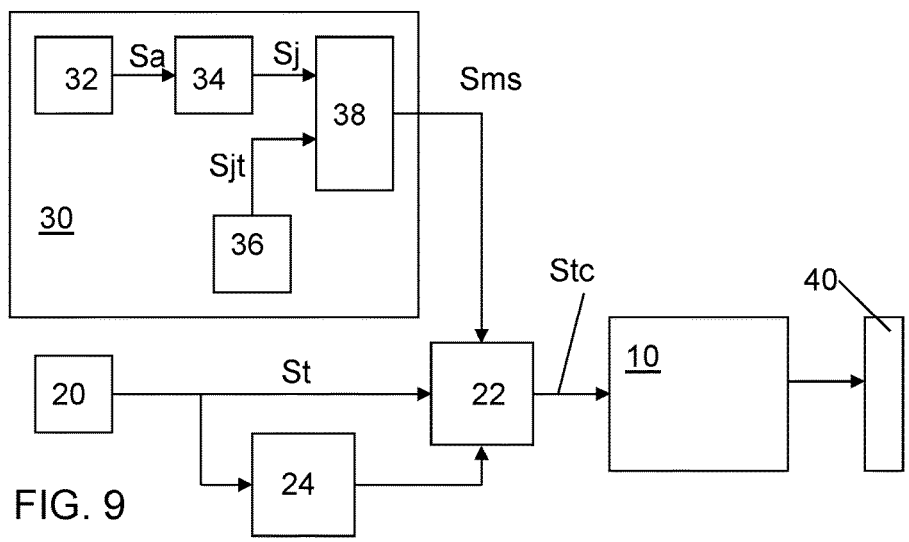
FIG. 9 schematically shows a seventh embodiment of a mobile device according to the first aspect of the present invention in more detail, FIG. 10 schematically shows an embodiment of a method of operating according to the second aspect of the present invention.

FIG. 9 shows a seventh embodiment. In this embodiment of the mobile device the touch input signal, although inhibited in the shock touch protection mode, is not completely blocked. In that embodiment the mobile device may have a mode control overrule unit 24 that that enables control by the touch input signal if it determines that a probability that the touch control signal results from a voluntary user action is greater than a probability threshold. In an embodiment this is realized in that the mode control overrule unit detects whether the user consistently repeats a particular user action. For example if the user repeatedly, e.g. more than 5 times in 10 sec. touches the touch control facility 20 within a narrow region, e.g. within a radius of 5 mm, the mode control unit determines that a probability that the touch control signal results from a voluntary user action is greater than a probability threshold, and allows control by the touch input signal St, even if the mobile device operates in the shock touch protection mode.

Figure 10:
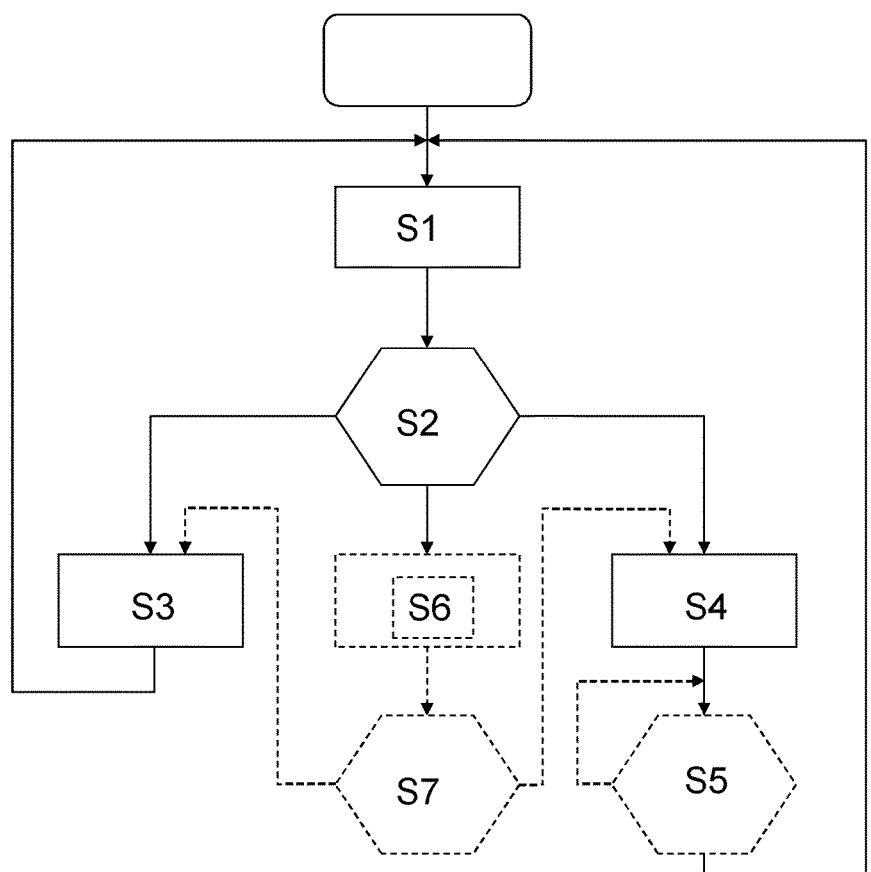

FIG. 10 schematically shows a method of operating a mobile device according to the second aspect of the invention. The method comprises the step S1 of providing a shock indication signal indicative for a magnitude of a third or higher derivative of a position of the mobile device. For example a magnitude of the jerk vector is determined in this step. Next, in step S2 the shock indication signal is processed to enable selection a between a plurality of mutually different operational modes. If the magnitude is below a jerk threshold value a normal mode of operation (M1, FIG. 3) is assumed causing step S3 to be carried out. Therein a user is enabled to controlling operation of the mobile device by touch input signal as control signals. Steps S1, S2 and S3 may be carried out simultaneously. I.e. while the user controls the device with touch control signals, the device continues to monitor the magnitude of jerk. If in step S2 the magnitude of jerk is found to exceed a jerk threshold value, a shock touch protection mode M2 is assumed in step S4, wherein touch control is inhibited. In an embodiment the method has an auxiliary step S5 wherein the shock touch protection mode M2 is maintained until a predetermined time-interval after the last occurrence of a magnitude greater than the shock/jerk threshold value.

If a moderate jerk magnitude is determined in step S2, a shock touch alert mode M12 is assumed in optional step S6. Therein the user is given the option to select between the normal mode of operation M1 or the shock touch protection mode of operation M2. Depending on this selection, made in step S7 operation continues with step S3 or step S4.

In summary, the present invention provides a mobile device comprising a data processing facility 10, a touch control facility 20 arranged to provide a touch input signal St to the data processing facility, and a motion state sensor facility 30 arranged to provide a shock indication signal Sj indicative for a magnitude of a third or higher derivative of a position of the mobile device. The mobile device further comprises a mode control facility 15, 22 for selecting one of a plurality of mutually different operational modes M1, M2. The plurality of mutually different operational modes at least comprises a normal operation mode M1 wherein the touch input signal is used as control signal for controlling operation of the mobile device and a shock touch protection mode M2, wherein the touch input signal is inhibited. The shock indication signal Sj is directly or indirectly used by the mode control facility. For example the mobile device may comprise a threshold facility for comparing the magnitude indicated by the shock indication signal with a shock threshold value and providing a mode control signal indicative for a result of this comparison.

Although embodiments of the present invention have been illustrated in the accompanying drawings and described in the foregoing detailed description, it will be understood that the invention is not limited to the embodiments disclosed, but is capable of numerous modifications without departing from the scope of the invention as set out in the following claims.

A 'facility', as will be apparent to a person skilled in the art, is meant to include any hardware (such as separate or integrated circuits or electronic elements) or software (such as programs or parts of programs) which reproduce in operation or are designed to reproduce a specified function, be it solely or in conjunction with other functions, be it in isolation or in co-operation with other elements. The invention can be implemented by means of hardware comprising several distinct elements, and by means of a suitably programmed computer. In device claims enumerating several facilities, several of these facilities can be embodied by one and the same item of hardware. 'Computer program product' is to be understood to mean any software product stored on a computer-readable medium, such as a floppy disk, downloadable via a network, such as the Internet, or marketable in any other manner.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). Also, use of the "a" or "an" are employed to describe elements and components of the invention. This is done merely for convenience and to give a general sense of the invention. This description should be read to include one or at least one and the singular also includes the plural unless it is obvious that it is meant otherwise.

The invention claimed is:

1. A mobile device comprising:
   a touch signal controller configured to provide a touch input signal;
   a motion state sensor configured to generate a shock indication signal that indicates a magnitude and a direction of a third or higher derivative of a position of the mobile device;
   a threshold comparator; and
   a mode controller configured to select, based on the shock indication signal, one of a plurality of mutually different operational modes comprising:
      a normal operation mode where an operation of the mobile device is responsive to the touch input signal, and
      a shock protection mode where the operation of the mobile device in response to the touch input signal is inhibited dependent upon the shock indication signal,
   wherein the threshold comparator is configured to:
      perform a comparison the magnitude indicated by the shock indication signal with a shock threshold value, and
      provide a mode control signal that indicates a result of the comparison, and
   wherein, upon indication by the mode control signal that the magnitude is greater than the shock threshold value, the mobile device operates in a shock touch alert mode that prompts a user to activate the shock touch protection mode.

2. The mobile device of claim 1, wherein, upon the indication by the mode control signal that the magnitude is greater than the shock threshold value, the mobile device operates in the shock protection mode.

3. The mobile device of claim 1, wherein the threshold comparator is configured to:
   adjust the shock threshold value according to a history of the shock input signal, wherein the shock threshold value is positively correlated with a historic magnitude indicated by the shock input signal.

4. The mobile device of claim 1, comprising a timer configured to maintain the mobile device in shock protection mode for a predetermined time-interval after a last occurrence of the magnitude greater than the shock threshold value.

5. The mobile device of claim 1, comprising a delay facility for delaying the touch input signal.

6. The mobile device of claim 1, further comprising a mode control overrule unit that that enables control by the touch input signal in the shock protection mode if it determines that a probability that the touch control signal results from a voluntary user action is greater than a probability threshold.

7. The mobile device of claim 1, wherein the shock touch alert mode is selected by the mode controller based on the magnitude of the shock indication signal being above a first threshold value.

8. The mobile device of claim 7, wherein the shock touch protection mode is selected by the mode controller based on the magnitude of the shock indication signal being above a second threshold value, the second threshold value being greater than the first threshold value.

9. A method of operating a mobile device, comprising acts of:
   determining by a touch signal controller, a shock indication signal indicating a magnitude and a direction of a third or higher derivative of a position of the mobile device;
   comparing the magnitude indicated by the shock indication signal with a shock threshold value;
   providing a mode control signal that indicates the comparison; and
   selecting by a mode controller, based on the magnitude the shock indication signal, an operation of the mobile device as one of:
      a normal operation mode where the operation of the mobile device is in response to a touch input signal,
      a shock touch alert mode where the operation of the mobile device is responsive to the touch input signal and an alert indication is provided, and
      a shock touch protection mode where the operation of the mobile device response to the touch input signal is inhibited,
   wherein, upon indication by the mode control signal that the magnitude is greater than the shock threshold value, the mobile device operates in the shock touch alert mode where the alert indication prompts a user to activate the shock touch protection mode.

10. The method of claim 9, wherein upon the indication by the mode control signal that the magnitude of the shock indication signal is greater than a second shock threshold value, selecting the shock touch protection mode.

11. The method of claim 9, comprising an act of adapting the shock threshold value according to a history of the shock indication signal, wherein the shock threshold value is positively correlated with a historic magnitude indicated by the shock indication signal.

12. A storage medium that is not a transitory propagating signal or wave, having stored thereon a instructions that when accessed by a device, enables the device to perform acts of:
- generating a shock indication signal, wherein the shock indication signal indicates a magnitude and a direction of a third or higher derivative of a position of the mobile device;
- comparing the magnitude indicated by the shock indication signal with a shock threshold value;
- providing a mode control signal that indicates the comparison; and
- selecting, based on the magnitude of the shock indication signal, an operation of the device as one of: a normal operation mode an operation of the device is responsive to a touch input signal, and a shock protection mode where the operation of the device in response to the touch input signal is inhibited dependent upon the magnitude of the shock indication signal,
- wherein, upon indication by the mode control signal that the magnitude is greater than the shock threshold value, the mobile device operates in a shock touch alert mode where the alert indication prompts a user to activate the shock touch protection mode.

* * * * *